(12) United States Patent
Barbalho et al.

(10) Patent No.: US 11,403,232 B2
(45) Date of Patent: Aug. 2, 2022

(54) SEQUENCE THRASHING AVOIDANCE VIA FALL THROUGH ESTIMATION

(71) Applicant: EMC IP Holding Company LLC, Hopkinton, MA (US)

(72) Inventors: Hugo De Oliveira Barbalho, Rio de Janeiro (BR); Jonas F. Dias, Rio de Janeiro (BR); Vinicius Michel Gottin, Rio de Janeiro (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/888,258

(22) Filed: May 29, 2020

(65) Prior Publication Data
US 2021/0374074 A1   Dec. 2, 2021

(51) Int. Cl.
*G06F 12/123* (2016.01)
*G06F 12/0891* (2016.01)
*G06F 21/78* (2013.01)
*G06F 12/0882* (2016.01)
*G06F 12/0871* (2016.01)

(52) U.S. Cl.
CPC ........ *G06F 12/123* (2013.01); *G06F 12/0871* (2013.01); *G06F 12/0882* (2013.01); *G06F 12/0891* (2013.01); *G06F 21/78* (2013.01)

(58) Field of Classification Search
CPC ............ G06F 12/0871; G06F 12/0882; G06F 12/0891; G06F 12/123; G06F 21/78
See application file for complete search history.

(56) References Cited

U.S. PATENT DOCUMENTS

| | | | |
|---|---|---|---|
| 6,457,102 B1* | 9/2002 | Lambright | G06F 12/0866 711/129 |
| 7,155,573 B1* | 12/2006 | Levin-Michael | G06F 12/123 711/133 |
| 10,102,147 B1* | 10/2018 | BenHanokh | G06F 12/128 |
| 2004/0215884 A1* | 10/2004 | Lambright | G06F 12/123 711/130 |

* cited by examiner

*Primary Examiner* — Aracelis Ruiz
(74) *Attorney, Agent, or Firm* — Workman Nydegger

(57) ABSTRACT

One example method includes determining a fall through threshold value for a cache, computing a length 's' of a sequence that is close to LRU eviction, and the length 's' is computed when a current fall through metric value is greater than the fall through threshold value, when the sequence length 's' is greater than a predetermined threshold length 'k,' performing a first shift of an LRU position to define a protected queue of the cache, initializing a counter with a value of 'r', decrementing the counter each time a requested page is determined to be included in the protected queue, until 'r'=0, and performing a second shift of the LRU position.

20 Claims, 10 Drawing Sheets

SEQUENCE THRASHING AVOIDANCE VIA FALL THROUGH ESTIMATION

FIELD OF THE INVENTION

Embodiments of the present invention generally relate to data caches and related processes. More particularly, at least some embodiments of the invention relate to systems, hardware, software, computer-readable media, and methods for using fall through estimation to reduce or avoid sequential thrashing in a cache.

BACKGROUND

Cache memory is employed in various applications and processes because it provides relatively fast response times compared, for example, to storage, and thus may enable a high level of performance for such applications and processes. However, problems may arise when a particular data pattern is requested repeatedly from the cache. In particular, a sequential thrashing problem may arise when certain data patterns in the cache are evicted immediately before being requested again. This sequential thrashing problem may particularly afflicts LRU caches, but may arise in connection with other caches also. This problem may occur when a sequence of pages are evicted from the cache immediately before being requested again. Although possibly an infrequent occurrence, the overall effect in hit ratios, and therefore in the cache response times, may be significant, especially if the sequence of pages is large.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
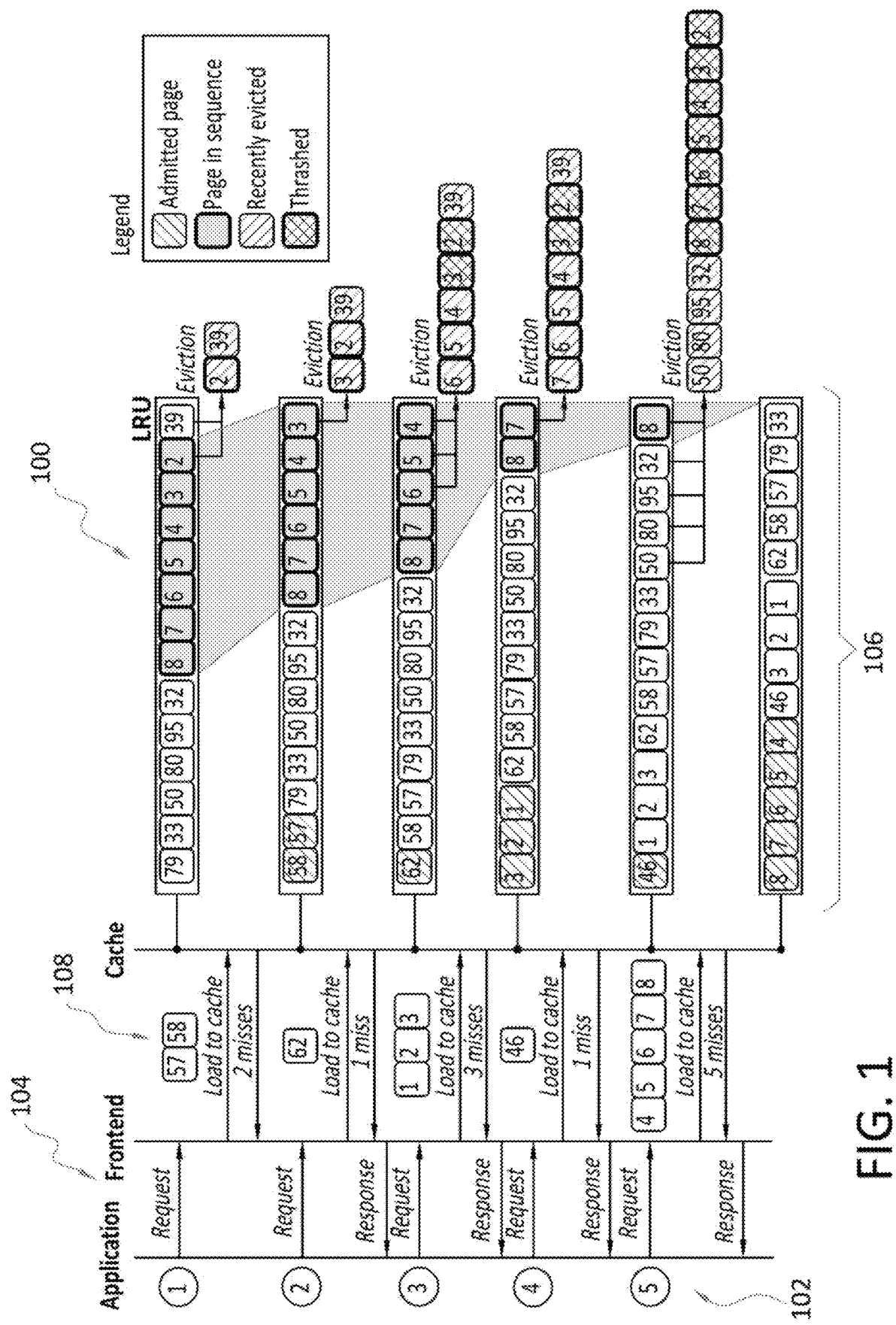
FIG. 1 discloses an example of the sequence thrashing problem in the cache of a storage system.

Embodiments of the present invention generally relate to data backup and restore processes. More particularly, at least some embodiments of the invention relate to systems, hardware, software, computer-readable media, and methods for using fall through estimation, which may be derived from performance and management metrics of a storage system for example, to reduce or avoid sequential thrashing in a cache.

Some example embodiments embrace a method that leverages fall through statistics to avoid sequential thrashing of long sequences. The mechanism may be relatively lightweight and non-intrusive, in the sense that the method may be readily combined with other cache policies, such as for prefetching, segmentation and management, for example. The method may leverage an estimation of the current fall through rate to determine whether or not to trigger the sequence thrashing avoidance steps. Any fall through estimation method may be used. In at least some embodiments, such an estimation may be derived from the performance and management metrics of a storage system, so that no additional computational processing is required. An example of a fall through estimation method that may be used in some embodiments is disclosed in U.S. Pat. No. 7,155,573 (O. Levin-Michael and J. Ezra, "Cache fall through time estimation."), incorporated herein in its entirety by this reference. In order to allow the method to operate concurrently with cache policies, such as those noted above, it is helpful to avoid performing any computations when the system is experiencing a relatively high load. Thus, some embodiments refer to current throughput statistics to determine if the most expensive, that is, in term of processing cost, sequence thrashing avoidance mechanism should be applied and, if not, only a basic mechanism may be used.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that sequential thrashing of long sequences in a cache may be reduced, or avoided. An embodiment of the invention may be employed in connection with other cache policies. An embodiment of the invention may reduce cache response times. An embodiment of the invention may be relatively lightweight in terms of the computational workload, and memory overhead, that it imposes on the system. An embodiment of the invention may provide the benefits of a dynamically determined eviction buffer. An embodiment of the invention may provide a throughput-adaptive mechanism to manage the content of the protected queue in low throughput scenarios, so as to provide an additional marginal protection against the sequential thrashing problem.

A. Example Operating Environments

In general, embodiments of the invention may be implemented in connection with systems, methods, processes, operations, software, and components, that involve the use of cache memory. For example, embodiments of the invention may be employed in connection with data read/write/delete operations, data deduplication operations, data backup operations, data restore operations, data cloning operations, data archiving operations, disaster recovery operations, and any operations relating to the operation of an application at a client site or elsewhere. More generally, the scope of the invention embraces any operating environment in which the disclosed concepts may be useful.

At least some embodiments of the invention provide for the implementation of the disclosed functionality in existing data protection platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Dell Cloud Storage, Microsoft Azure, Amazon AWS, and Google Cloud. More generally however, the scope of the invention is not limited to employment of any particular type or implementation of cloud storage.

In addition to the storage environment, the operating environment may also include one or more clients with applications that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

B. Overview

The following discussion provides further possible context for example embodiments of the invention. This discussion is not intended to limit the scope of the invention in any way.

Cache mechanisms may be crucial to computer systems such as storage arrays and compute clusters. Correctly placing data with a high probability of being requested on fast memory media may substantially reduce the response times of input/output (I/O) requests. However, fast memory such as dynamic random-access memory (DRAM) hardware is expensive, and the memory dedicated to cache is scarce. Given the diversity and unpredictability of the I/O stream, it is unfeasible to hold all of the data that will result in cache hits in memory. Even if the DRAM becomes cheaper over time, and that certainly would increase the amount of available cache, the amount of generated data is also increasing. Thus, smart orchestration of the cache will still be required.

In some cases, cache systems may sit between application servers and persistent data storage devices. The cache system may implement logic to manage I/O operations, allowing for quick responses by the cache system to reads and writes from the application server without the need to access the persistent data storage devices which may have relatively slow response times as compared with the cache system.

Due to the often limited size of a cache however, only a portion of the requested data chunks are kept in the cache at any given time. If a requested chunk is not in the cache, an event referred to as a cache miss, then that chunk must be loaded from the persistent storage device and the application that requested the chunk does not benefit from any speed-up. However, if a chunk is found in the cache, an event referred to as a cache hit, the response time for the request may decrease significantly. Hence, some cache policies are ultimately focused on the management of limited memory to maximize the number of cache hits. Another consideration in the design of cache systems is the computational overhead imposed by the cache policies. For instance, a well-known policy for managing cache is the LRU (least recently used) policy which, in some circumstances, may deliver satisfactory performance with negligible overhead. In some cases, the combined hardware and software architecture of a storage system may be optimized for favoring the efficiency of the LRU policy.

Under some scenarios, the problem of sequential thrashing may afflict LRU caches. This problem occurs when a sequence of pages are evicted from the cache immediately before being requested again. Although possibly infrequent in some circumstances, the overall negative effect in cache hit ratios and, therefore, in cache response times, may be significant, especially if the sequence is large. A naïve solution to this problem might be to check the contents of the cache at every request to determine whether the cache is currently thrashing a sequence. This approach may impose a small, but relevant, computational overhead, which could mitigate the gains of avoiding the sequence thrashing. Thus, such an approach may not be desirable.

It would be useful if alternative, more effective, approaches to the sequence thrashing problem were also compatible with other kinds of cache policies. Thus, embodiments of the invention may, among other things, avoid the sequence thrashing problem without incurring in significant computational overheads, and in a way that can be readily combined with other complex cache policies, if necessary.

Note that as used herein, the term 'data,' such as in reference to data written to storage and/or to memory, is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

With reference now to FIG. 1, further details are now provided concerning possible circumstances that may be addressed by one or more embodiments of the invention. In general, the hypothetical of FIG. 1 discloses how an example 100 of how sequential thrashing might occur in the cache of a storage system.

In FIG. 1, provided for illustrative purposes, the pages are referred to by small integer numbers, the number of cache slots of the segments is limited to only a few, and the sequence comprises only a handful of chunks. In a more real-world scenario, especially in large-scale storage systems, the addressing space may be very large, and pages are identified by correspondingly large values, cache segments may comprise many thousands of slots, and sequences in the cache may comprise many chunks of data.

At the left side, there is a timeline 102 of the requests from one or more applications (numbered 1 through 5), and how the incoming requests are handled by the front end interface 104 of the system. In this example, six different states 106 of the cache are indicated, where the initial state of the cache is shown at the top of FIG. 1 and comprises a total of 13 chunks of data, such as pages. The highlighted portion of the initial state of the cache comprises a sequence that is close to the point of eviction from the cache, that is, the sequence is at the tail end of the LRU queue. In this example, the highlighted sequence comprises pages 2 through 8.

The first request 108, for pages 57 and 58, is processed, admitting both of those pages at the head of the LRU queue. These pages are admitted in order, so that the resulting second state of the cache after admission of pages 57 and 58 comprises the last page in the request as the first page in the LRU queue. Thus, in FIG. 1, the first request 108 evicts page 39 and also page 2, which is at the end of the sequence in the initial state of the cache. A second request, for page 62, similarly evicts page 3 from the back end of the LRU queue. At this stage, the system starts to suffer the sequence thrashing issue.

In particular, the third request, for pages 1, 2 and 3, roughly comprises the start of the same sequence which has just started to be evicted. Thus, the admission of those pages 1, 2 and 3 to the cache results in a miss, since pages 2 and 3 were recently evicted.

Moreover, the admission of pages 1, 2, and 3, also evicts an additional part of the sequence, namely, pages 4, 5, and 6. After an intermediate request for page 46, the application then requests the remainder of the sequence, that is, pages 4-8. However, at this point, all of those pages have been evicted and, as a result, the request for the remainder of the sequence results in a large number of misses, one for each of the requested pages 4-8. This hypothetical of FIG. 1 thus illustrates the sequence thrashing that may occur in a cache memory. Following is a discussion of some particular circumstances that may arise in connection with sequence thrashing.

One such circumstance concerns computational costs and compatibility with complex cache policies. A method, such as embraced by embodiments of the invention, is desirable to avoid the sequential thrashing problem without incurring in meaningful additional computational costs for the management of the cache. Such embodiments may apply complex cache policies, such as for cache prefetching, segmentation or parametrization for example, in tandem with the sequential thrashing avoidance.

Another circumstance relating to sequence thrashing concerns the relative infrequency with which sequence thrashing may appear. In particular, the sequence thrashing problem may be infrequent in some environments and circumstances and, thus, any naïve method of constantly inspecting the contents of the cache would incur in unnecessary computational costs. These costs may offset part, or all, of the benefits of avoiding the sequential thrashing.

Finally, the requests for a sequence that is close to eviction, or that is currently causing sequential thrashing, may not necessarily be contiguous or in any particular order. Hence, a trivial solution, such as one that checks the incoming requested pages against the to-be-evicted pages, may not be effective to avoid sequence thrashing. As shown in the example of FIG. 1, it can be seen that between request 3 (for pages 1, 2, and 3) and request 5 (for pages 4, 5, 6, 7, and 8), a request for an unrelated page 46 takes place. This type of circumstance may be unavoidable, and can happen because the cache is shared, serving one or more applications and covering the addressing space of many logical units. While complex mechanism might be employed in an attempt to solve this issue, they would likely incur in unacceptable computational costs.

C. Aspects of Some Example Embodiments

As note herein, cache systems are instrumental to guarantee the performance of large-scale storage devices. In specific contexts, cache systems suffer from the sequential thrashing problem, in which a sequential range of pages in the cache is evicted immediately or soon before it is requested. While the circumstances that cause sequence thrashing may be relatively uncommon, the benefits of avoiding such behavior can be relevant for the overall performance of the system as long as the computational costs of the avoidance mechanism are small enough. Furthermore, such a mechanism must be able to be combined with cache policies in general without incurring in additional computational and memory overheads. Thus, example embodiments include methods to avoid the sequence thrashing in LRU caches, by employing an estimate of the cache fall through. Example embodiments may thus avoid the worst-case scenarios of sequence thrashing while incurring negligible computation costs.

Figure 2:
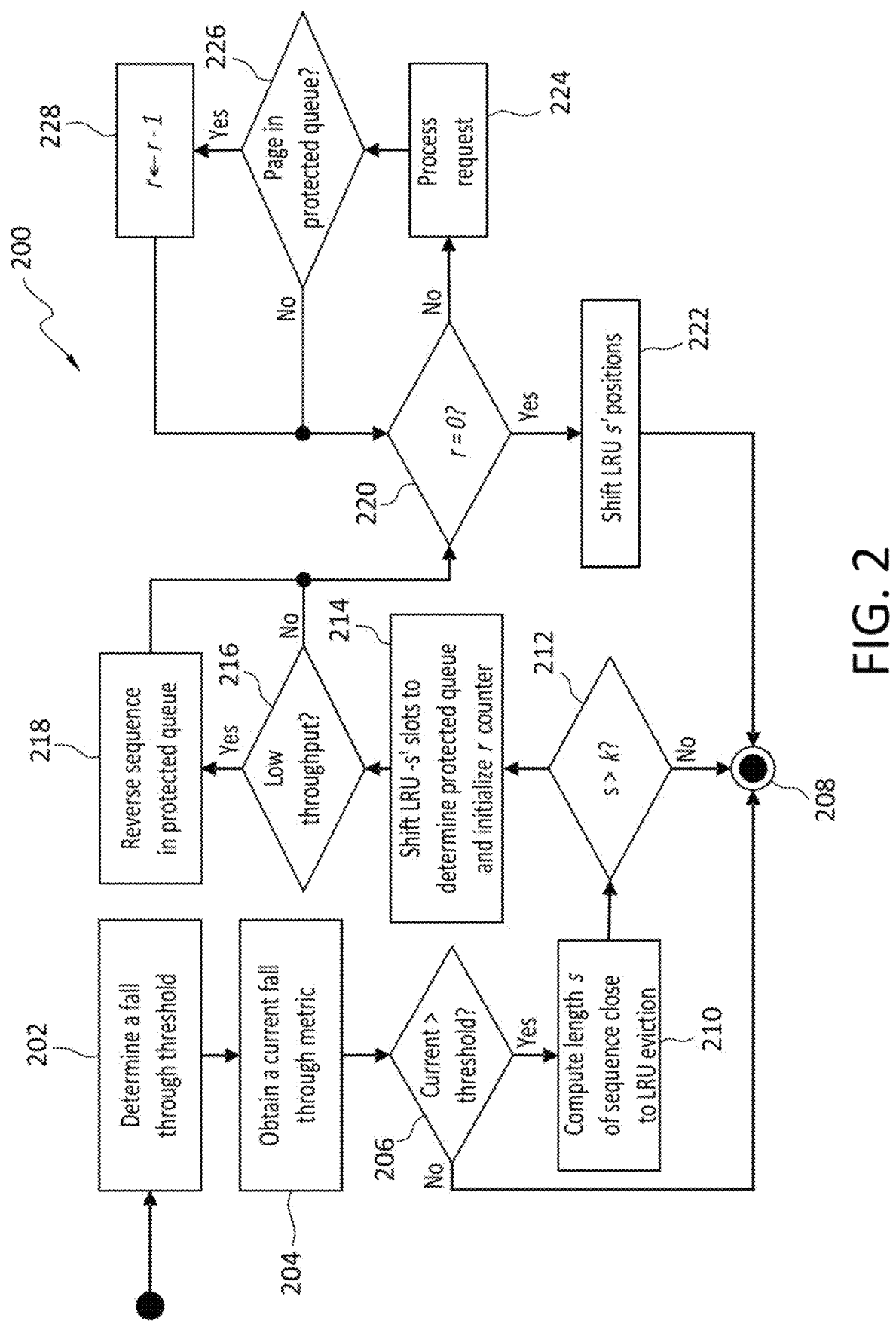
FIG. 2 discloses aspects of an example method for avoidance of sequence thrashing.

With particular attention now to FIG. 2, an example method 200 is disclosed for addressing the sequence thrashing problem. The method 200 may be performed in whole in part by a cache, or cache controller. However, the scope of the invention is not limited to performance of part/all of the method 200 by any particular entity or group of entities. The cache may reside, for example, in a datacenter, such as a cloud storage datacenter, and may be used to service IOs directed to the datacenter. However, it is not required that the cache reside in any particular environment.

The method 200 may begin by determining 202 a fall through threshold 'q' that comprises a numerical value to be compared to a current, observed, fall through rate 'f.' The current fall through rate may be obtained 204 using any suitable method, one or more examples of which are disclosed herein. The fall through threshold q may then be compared 206 with the current fall through rate f. If the current fall through rate f is determined 206 to be less than, or equal to, the fall through threshold q, the method 200 may terminate at 208. On the other hand, the Sequence Thrashing Avoidance Mechanism (STAM) according to one or more example embodiments may be invoked if the current fall through rate f is determined 206 to be greater than the fall through threshold q. The decision to apply the STAM may be motivated by an empirical observation that accelerated fall through correlates directly with the sequential thrashing problem, as discussed elsewhere herein.

When the current fall through rate f is determined 206 to be greater than the fall through threshold q, the method 200 may advance to 210 where the length of the sequence close to LRU eviction is computed. As used herein, a sequence 'close' to LRU eviction embraces, at least, the last unprotected sequence in the cache that meets specified gap and skip criteria. One embodiment of this computation is given by the following example algorithm 'BackwardSequenceLength':

```
BackwardSequenceLength(cache, max_gap):
    i ← size(cache)
    len ← 1
    inner_gap ← 0
    gap ← 0
    while gap ≤ max_gap and i > 0 :
        if cache[i − 1] = cache[i + gap] + 1:
            curr_len ← len + 1
            inner_gap ← gap
    else:
        gap ← gap + 1
    end if
    i ← i − 1
    end while
    return len, inner_gap
```

Figure 3:
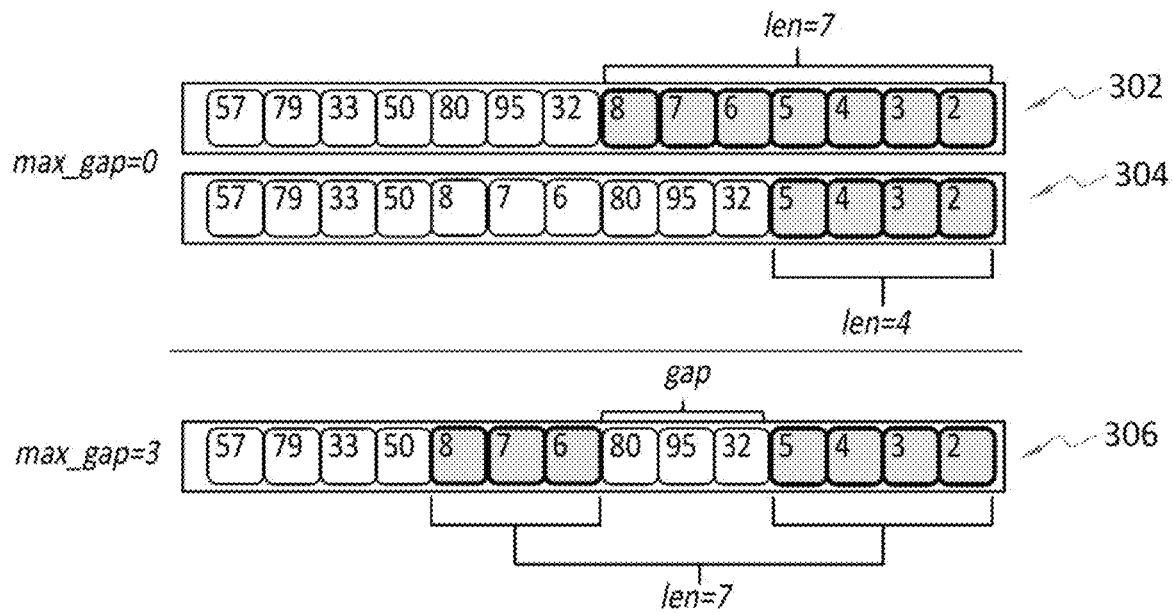
FIG. 3 discloses example states of a cache and the resulting sequence lengths with different values for the max_gap parameter for an embodiment of the BackwardSequenceLength algorithm.

The algorithm 'BackwardSequenceLength' may scan the cache backwards to find the length of a contiguous, or semi-contiguous, sequence contained therein. With reference now to FIG. 3, there is disclosed an example of two alternative cache states, and illustrative values of a sequence length. In particular, FIG. 3 discloses example states of the cache and the resulting sequence lengths with different values for the max_gap parameter for the BackwardSequenceLength algorithm.

FIG. 3 discloses two alternative cache states 302 and 304. In the first cache state 302, the algorithm obtains a sequence length 'len' of 7 chunks. In the second cache state 304, the algorithm may obtain a sequence length of 4 chunks given a max_gap of zero. Particularly, in the second cache state 304, it can be seen that there is a gap of 3 chunks (chunks 32, 95, and 80) between chunk 5 and chunk 6, where no such gap exists in the first cache state 302. However, because the maximum permissible gap is set to zero, the sequence length in the second cache state 304 is only 4 chunks.

In the third cache state 306, it can be seen that a max_gap of 3 is specified. Thus, in this illustrative example in which a maximum gap of 3 is permissible, the gap (chunks 32, 95, and 80) in the sequence is disregarded and the full sequence of 7 chunks is considered. Note that while a maximum gap of 3 chunks in the sequence is deemed permissible, those chunks are not, in some embodiments at least, included in the measurement of the sequence length len.

As the foregoing examples illustrate, the BackwardSequenceLength algorithm may allow for sequences with total gaps of at most max_gap chunks in them. It is noted that the algorithm may be modified to consider a different interpretation for the parameter max_gap. For instance, max_gap may alternatively be interpreted as maximum allowed space between any two chunks of the sequence.

Figure 4:
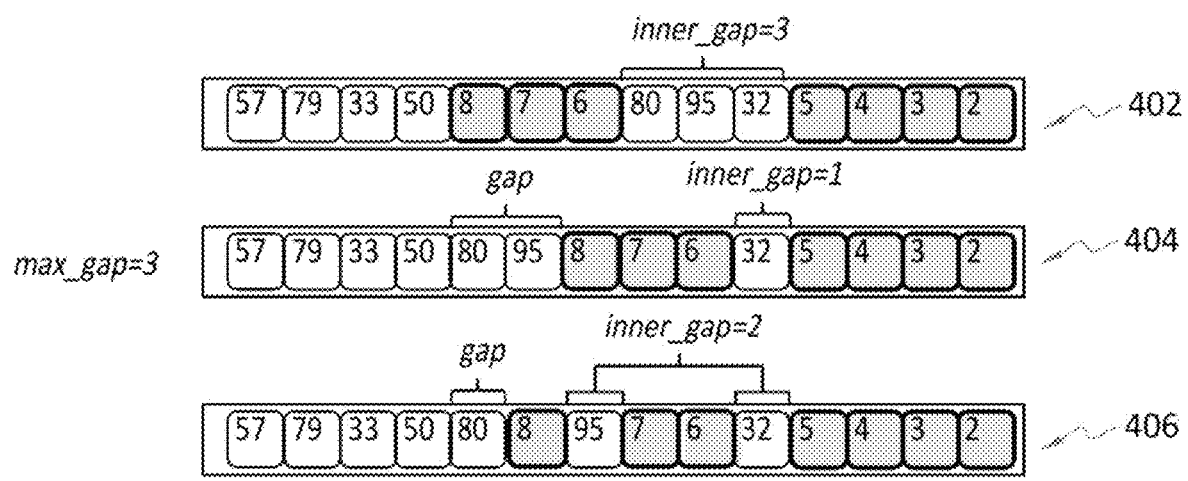
FIG. 4 discloses results of an embodiment of an algorithm illustrating the resulting inner_gap.

With reference now to FIG. 4, an example of the results of the first BackwardSequenceLength algorithm discussed in connection with FIG. 3 are illustrated, showing the inner_gap. Particularly, three cache states 402, 404, and 406, are disclosed. In each of these states, application of the first embodiment of the algorithm results in an inner_gap, that is, gaps that are within the sequence. Thus, in the cache state 402, an inner gap of len=3 is included in the sequence, in the cache state 404, an inner gap of len=1 is included in the sequence, and in the cache state 406, an inner gap of len=2 is included in the sequence. Note that cache states 404 and 406 also include a gap (blocks 80 and 95, and block 80, respectively) that is not an inner gap, that is, does not fall within the sequence.

In one adaptation of the first algorithm discussed above, a more straightforward computation may be implemented, without allowing for maximum gaps, for example. In this case, the algorithm may comprise simply scrolling the LRU queue backwards counting the number of chunks that compose a sequence. This embodiment comprises a second BackwardsSequenceLength algorithm, which has a max_gap argument of 0. On the other hand, a more complex third algorithm may be employed that disregards pages at the end of the LRU queue. One example embodiment of a skip algorithm is set forth below.

```
BackwardSequenceSkip(cache, max_skip, max_gap):
    longest_sequence_skip ← 0
    longest_sequence_len ← 0
    longest_sequence_gap ← 0 for skip
    from 0 to max_skip:
        len, gap ← BackwardSequenceLength(cache[0: -skip],
            max_gap)
        if len > longest_sequence_len:
            longest_sequence_skip ← skip
            longest_sequence_len ← len
            longest_sequence_gap ← 0
        end if
    end for
    return longest_sequence_skip, longest_sequence_len,
    longest_sequence_gap
```

This example implementation of a skip algorithm, seeks the longest sequence figuring among the last max_skip chunks in the LRU queue. With attention to FIG. 5, there are disclosed example alternative cache states 502, 504, and 506, and their resulting length and skipped chunks at the end of the LRU queue for each state, given different parametrizations of the max_skip argument.

In more detail, in cache state 502, a max skip of 0 is defined. Thus, the longest possible sequence of blocks nearing eviction is 1, namely, block 39. In this case then, the third algorithm generates the same result as the first algorithm. In the cache state 504 however, a max skip of 3 is defined, with the result that the sequence can be thought of as shifted 3 blocks from the end of the LRU queue. Thus, the longest possible sequence of blocks nearing eviction, taking into account the max skip length of 3, is 7. In this case, the skip occurs at the end of the queue but since the skip is within the max skip parameter value, the next 7 blocks define the longest possible sequence. Finally, as shown in cache state 506, both a max gap and a max skip are defined, each having a value of 3. Thus, the longest sequence is shifted, and includes a gap. Again, since both are permissible, a longest possible sequence of 7 blocks is defined. As these examples illustrate, the longest possible sequence of blocks nearing eviction may be defined based on various parameters, whose values may be changed, such as max gap and max skip.

The embodiments of the BackwardSequenceSkip algorithm addressed thus far may be straightforward computations that may be implemented to leverage the structure of the LRU queue, which may be implemented as a double-linked list. The complexity of the computation will be O(n) in the average case, where n is the average size of the sequences found at the tail end of the LRU queue. The complexity of the BackwardSequenceSkip algorithm will be O(n×max_skip). Since the max_skip value may typically be a small constant value, that value may be much smaller than the size of the longest sequences and we can consider the algorithm O(n) in the worst case.

Figure 5:
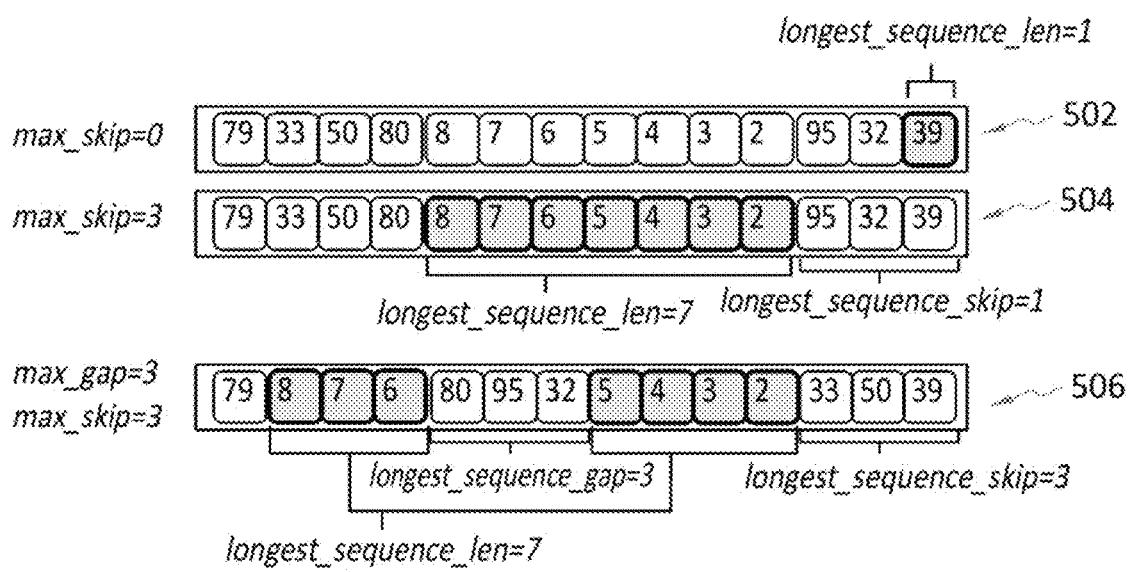
FIG. 5 discloses example states of a cache and the resulting sequence lengths with different values for the max_skip and max_gap parameter for an embodiment of the BackwardSequenceSkip algorithm.

With the foregoing discussion of FIGS. 3-5 in view, attention is directed again to FIG. 2 wherein, after the sequence length 's' has been determined 210, such as by the methods discussed in connection with FIGS. 3-5, the method 200 proceeds and the sequence length s of the sequence is compared 212 with a predetermined threshold length 'k' in order to determine the relevance of that sequence. Particularly, if the length s is smaller than that threshold k, the instance of the method terminates 208. Otherwise, the method 200 proceeds to shift the LRU position 214 in the cache.

Figure 6:
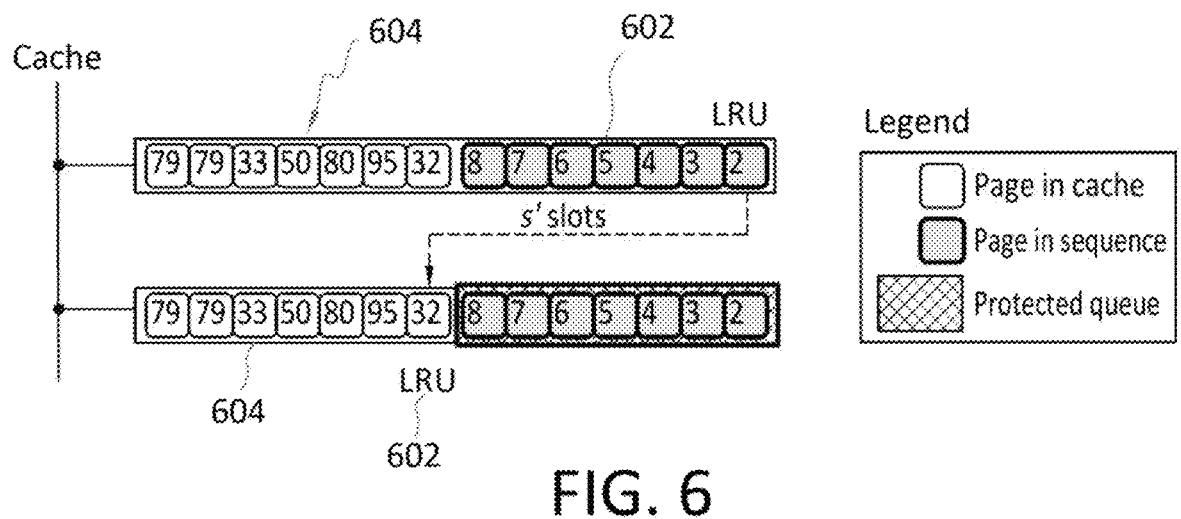
FIG. 6 discloses an example of the shifting of the LRU position in the queue by s' slots.

FIG. 6 discloses an example of the shifting of the LRU 602 position in the queue 604 by s' slots, that is, the LRU position is moved toward the front of the cache, or toward the MRU block of the cache. Thus, as used herein, the front of the cache may be defined by the MRU block, while the back of the cache may comprise the block(s) nearest the point of eviction, such as the LRU block.

In the illustrated example, the shifting of the LRU takes the form of a reassignment of the point of eviction in the cache. The number of slots s' by which the LRU is shifted is determined by the length of the sequence s and the number of any skips in the cache. As shown in the example of FIG. 6, this shifting effectively reassigns a numbers' of chunks in the cache to a dynamically defined protected queue from which pages are, temporarily, not evicted even if they otherwise would be. Thus, the point of eviction, which was initially block 2, is now shifted to block 32. That is, absent overriding circumstances, the next block of the queue to be evicted will be block 32.

In a relatively simple case with no skips or gaps, the value s' will correspond directly to, that is, will be the same as, the sequence length s. In cases with skips or gaps, however, those must be accounted for. In the case of the algorithm BackwardSequenceSkip and BackwardSequenceLength, the resulting s' value is given by the sum of the resulting values of the algorithms. Examples of this approach are shown in FIG. 7, which shows the shifting of the LRU queue in an embodiment in which skipped pages and gap pages are allowed in the sequence, as given by the BackwardSequenceSkip algorithm with both max_gap and max_skip set to 3.

Figure 7:
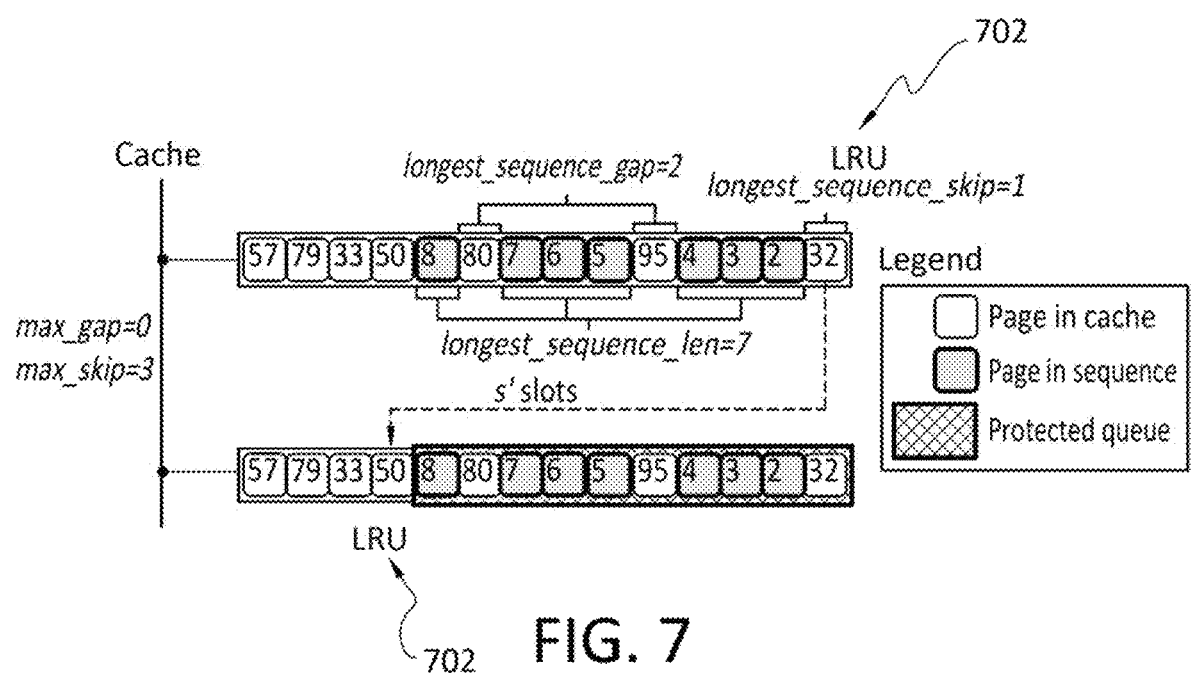
FIG. 7 discloses an example of the shifting of the LRU queue in the embodiment in which skipped pages and gap pages are allowed in the sequence, as given by an embodiment of the BackwardSequenceSkip algorithm with both max_gap and max_skip set to 3.

In the example of the FIG. 7, the value of s', that is, the length of the queue that is protected from eviction, is determined as the sum of the results of the BackwardSequenceSkip, that is: 1 skipped page (longest_sequence_skip) (page 32 in FIG. 7), 2 gap pages (longest_sequence_gap) (pages 95 and 80 in FIG. 7), and the actual sequence length (longest_sequence_len) (length of 7, accommodating permitted gaps 95 and 80). Note that regardless of the embodiment of the sequence length determination, the LRU position is the last position before the sequence, and that the entire sequence is contained within the protected queue.

Besides shifting the LRU, part 214 of the method comprises setting the value of the 'r' counter. This counter will determine the number of requests to be processed before the LRU queue is returned to its original configuration, that is, the number of requests to be processed before the 'protected queue' is once again allowed to be evicted from the cache. The r value can be set to be any integer, including 0.

Setting the r value may be part of 214, rather than a separate process, as the value of r may be determined based partly on the total size s' of the protected queue. In one example embodiment, the value of r may set depending on the value of s' and the average size of the recent incoming requests. The latter value is a typically available statistic in storage systems, potentially used as a parameter for cache policies. If that statistic is not available, the value of r may be defined based solely on s'.

One possible reason for the definition of the value of r may be considered as follows. On the one hand, larger average request sizes mean that the sequence in the protected queue would be evicted in a shorter number of requests. Larger request sizes may also imply that a single request may hit the entire sequence, or at least a significant portion such as a majority of the sequence, at once. Hence, it may be desirable to 'protect' the sequence for a relatively longer number r of requests. Therefore, larger average request sizes may be used to positively influence, that is, increase, the value of r.

On the other hand, the shifting of the LRU by s' chunks may mean that the pages not in the sequence are being evicted sooner. The larger the value of s, the smaller the effective LRU queue for pages not in the sequence. Furthermore, especially if the average request sizes are smaller than the sequence length, longer sequences can 'endure' requests without being completely evicted. That is, smaller requests will evict smaller portions of the sequence. Hence, larger values of s' should negatively influence, that is, decrease, the value of r. This reasoning may also motivate an additional protection mechanism, described below.

Regardless of the algorithm decided to determine the value of r, the method 200 may then proceed to check the current 10 throughput 216, or simply 'throughput.' In a similar fashion to the average request size, the current 10 throughput is typically available as performance statistic in storage systems. If a statistic for the current throughput is not available, the method 200 may be amended to always assume that the throughput is high, the method 200 may default to 'No' in the Low throughput? decision point 216. If a statistic is available and indicates that the system is currently idle, a procedure may be performed to provide additional 'protection' to the sequence. This procedure may comprise reversing the sequence in the protected queue 218.

Particularly, this reversing may mitigate the fact that the start of a (semi) contiguous sequence in a LRU queue is evicted first. That is, especially in cases with longer sequences, it may be useful to reverse the protected queue so that the latter portions of the sequence are eventually evicted first. This is empirically demonstrated to partially mitigate the sequential thrashing. Note also that this computation may only take place when the throughput is low, thereby avoiding negatively affecting the response times of incoming requests. In other embodiments of the method 200, the process 218 of reversing the protected queue may optionally comprise identifying the skipped pages and gap pages, and moving them to the end of the protected queue after the reversing of the sequence.

Regardless of the throughput, and reversal of the protected queue or not, the method 200 (FIG. 2) proceeds to 'protect' the sequence from eviction from the cache for a predetermined number of requests. That is, the r counter previously initialized is iteratively decremented as requests without any hits are processed.

Figure 8:
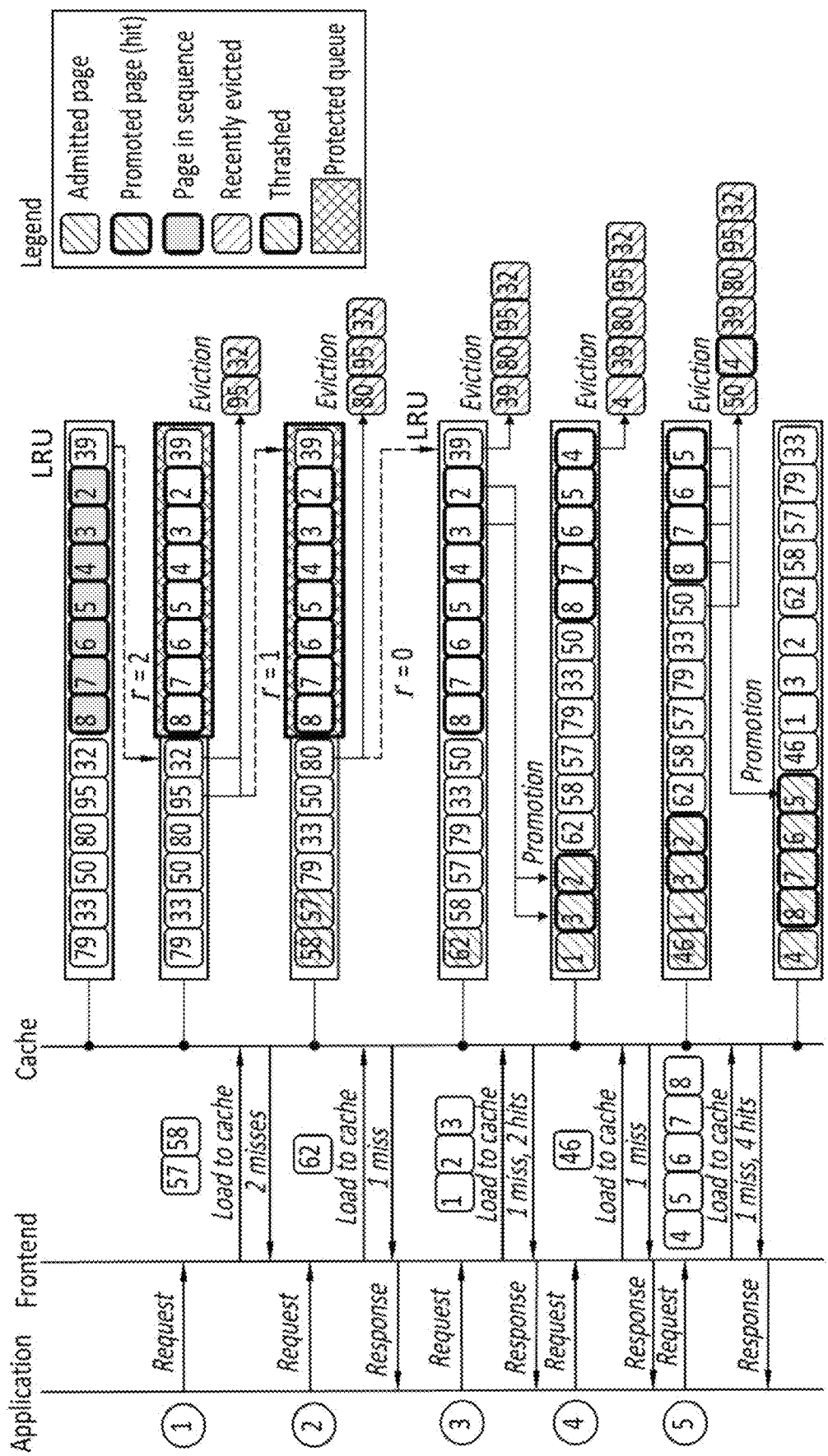
FIG. 8 discloses an example of a protected queue, in which the protection during two requests (setting r=2) is enough, in the illustrated example, to avoid the majority of the sequence thrashing.

FIG. 8 discloses the effect of the protected queue for r=2 in the processing of the same requests as in the example of FIG. 1. Particularly, the example of FIG. 8 illustrates that the protection during two requests (setting r=2) is enough, in this reduced example domain, to avoid the majority of the thrashing.

During these r requests, any evictions will remove pages from the shifted LRU queue, but will ignore the protected queue. Thus, for example, the request for blocks 57 and 58 will result in 2 misses, since neither block is present in the cache, and that request also correspondingly results in the eviction of blocks 32 and 95, while the protected sequence is unaffected. The counter will correspondingly decrement from 2 to 1 since no hits are obtained. As the counter r reaches zero, the LRU queue is reset by shifting it s' positions, that is, back to the original configuration. At this point the (reversed or not) sequence (and potential skips, gaps) will be evicted as usual.

Note that in the example of FIG. 8, there are no cases in which a requested page is in the protected cache. Hence, for each request 224, a check 226 is performed to determine whether or not the requested page or block is in the protected sequence and, if so, the counter is decremented 228 until the counter reaches a value of zero, after which, the LRU position is shifted 222 as shown, that is, from the newest block prior to the start of the protected sequence (block 80), to the end of the protected sequence (block 39). It is noted with respect to FIG. 8 that the value of r is set as 2 for the purposes of demonstration of the mechanism in an example. However, a typical value for r in large scale storage systems may be much larger, possibly comprising hundreds, or many thousands, of requests.

With continued reference to FIG. 8, it can be seen that after r=0, block 39 of the protected cache is evicted, and requested blocks 2 and 3, now at the end of the protected cache, are then promoted to near the front of the cache, as a result of the request 3 for blocks 1, 2 and 3. Thus, sequence thrashing with respect to blocks 2 and 3 at least is avoided, as those blocks, which were near the point of eviction, are retained for a period of time in the cache by being promoted to the front of the cache.

Figure 9:
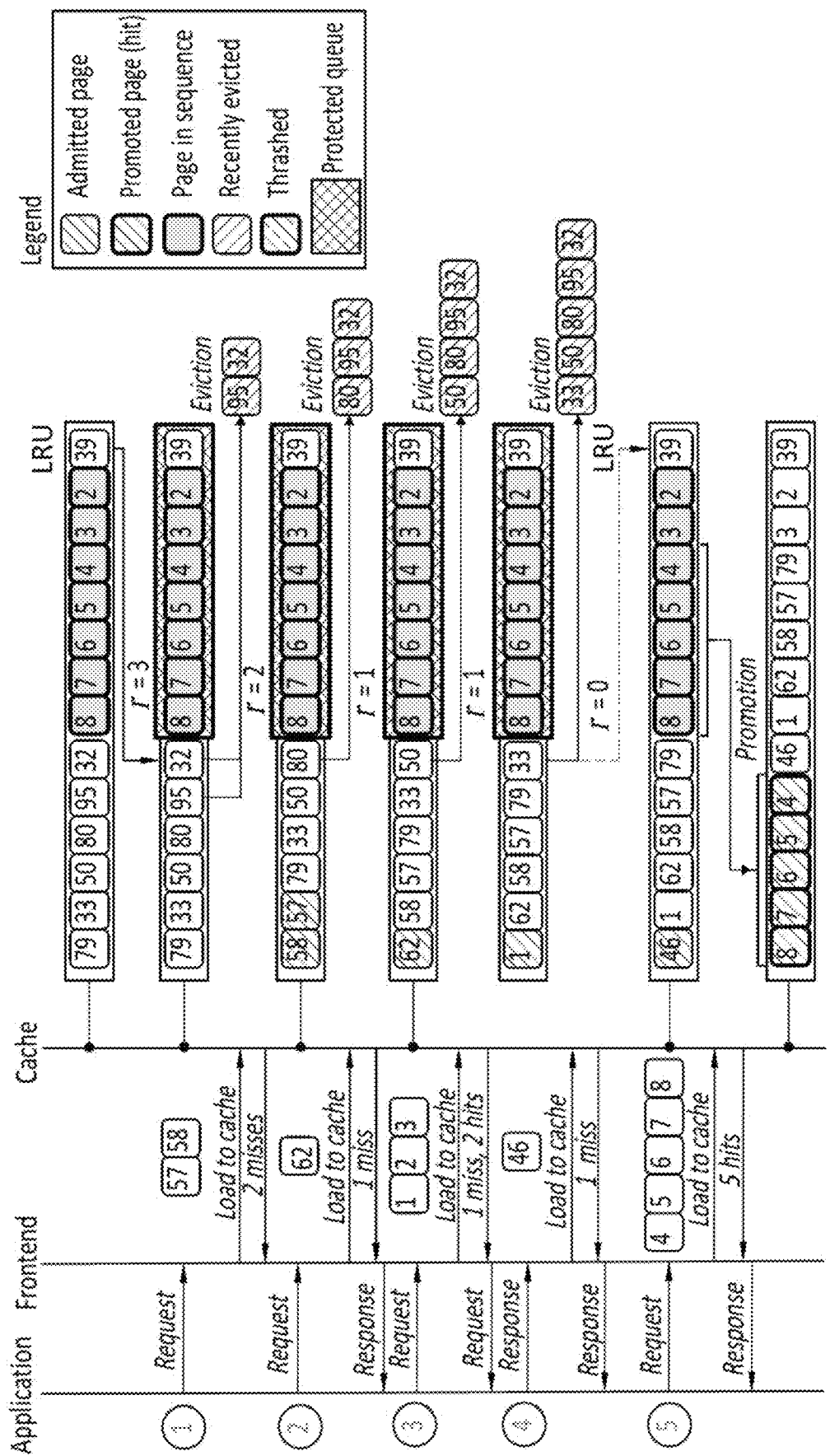
FIG. 9 is similar to FIG. 8 except that r=3, which results in request 'hitting' pages in the protected queue and avoids, in this illustrative example, the sequence thrashing entirely.

Turning now to FIG. 9, another example is presented, which may be similar to the example of FIG. 8, except that r=3 in the example of FIG. 9. Setting r=3 results in requests 'hitting' pages in the protected queue and avoids the thrashing entirely. In this example, the method does not promote pages within the protected queue nor promotes them to the LRU cache.

More particularly, in the example of FIG. 9, it can be seen that the request 3 for pages 1, 2 and 3 results in a partial hit because pages 2 and 3 are present in the protected queue of the cache. Due to this hit, the counter is not decremented (see 228 of FIG. 2) and remains at r=1. Further, the 'hit' pages 2 and 3 in the protected queue are not promoted, either within the protected queue, nor to the LRU queue. On the other hand, the missing block 1 is added to the cache. These results indicate that dealing with dynamic sizes of the protected queue may be avoided by embodiments of the invention. Thus, example embodiments may avoid the cyclic thrashing, as a dynamic cache segment, such as a temporary buffer for long sequences, would but with a much smaller computational footprint.

With continued reference to the example of FIG. 9, request 4 for block 46 results in a miss and, accordingly, the counter is decremented to 0. Correspondingly, the LRU position is moved from the block 33 in front of the protected queue to the back of the protected queue at block 39. Because r=0, the final request 5, for blocks 4, 5, 6, 7, and 8, results in the promotion of those blocks from the protected queue to the front of the cache.

As will be appreciated from this disclosure, the disclosed methods, including example method 200, may be executed periodically, typically at regular intervals, although the use of regular intervals is not required. Alternatively, the method may be executed synchronously with the fall through estimation. That is, the method may be executed every time a new fall through estimation is obtained. Finally, if used in tandem with cache policies such as prefetching, segmentation or management policies, the triggering of the performance of the method may be delegated to the cache policies. Note that policies such as the prefetching, segmentation or management policies may be amended to determine whether to check for the sequential thrashing problem.

D. Experimental Examples

As disclosed herein, embodiments of the invention include a lightweight mechanism for avoiding sequential thrashing based on fall through estimation. Example methods according to embodiments of the invention define a protected queue of sequential address ranges that provides the benefits of a dynamically determined eviction buffer with minimal computational and memory overheads. The example methods may be used in tandem with complex cache policies. As well, example embodiments may additionally comprise a throughput-adaptive mechanism for managing the content of the protected queue in low throughput scenarios. This mechanism may provide an additional marginal protection against the sequential thrashing issue. Applying this mechanism only in low throughput scenarios may ensure that no ill-effect is imposed on the response time of the actual workload requests.

Figure 10:
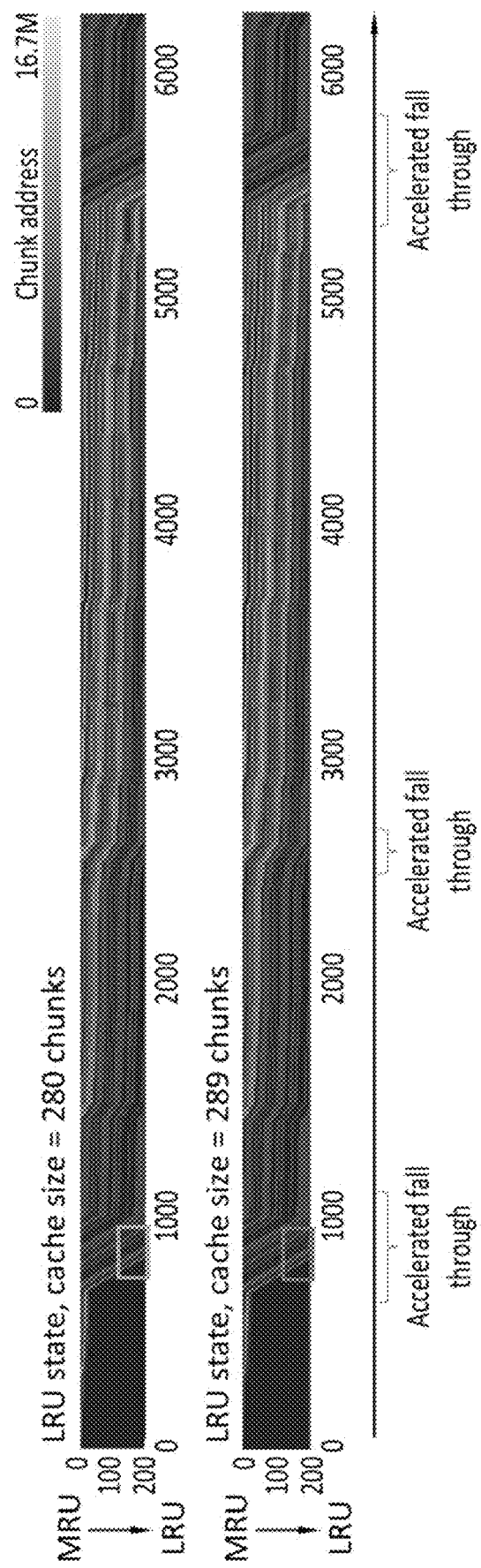
FIG. 10 discloses an example timeline of the accessed chunk addresses for a real workload, in which the top timeline represents a LRU cache with 280 chunks, and the bottom timeline represents the same workload in a LRU cache with 289 chunks.

With attention next to FIG. 10, details are provided concerning a real world workload in which a large sequence is thrashed. In this example, the illustrative cache size is about 300 chunks, while the system comprises 16.7M pages, that is, the address space of the system is about 16.7 million pages. Each chunk may be, for example, about 500 MB. In one particular example, the cache of an entire storage system may have 45M positions. FIG. 10 discloses a representation of the accessed chunk addresses over time (X-axis) for two similar LRU caches, and includes a timeline of the accessed chunk addresses for a real workload. The top timeline in FIG. 10 represents an LRU cache with 280 chunks, and the bottom timeline represents the same workload in an LRU cache with 289 chunks.

The downward slopes in the timeline indicate periods of accelerated fall through, that is, the downward trend of a chunk in the cache from a Most Recently Used (MRU) position to a Least Recently Used (LRU) position means that chunk is 'pushed' towards LRU eviction relatively faster. Thus, the steeper the downward slope in the downward trend of a chunk, the faster that chunk is moving towards LRU eviction. Areas where the downward slope is relatively steeper are identified in FIG. 10 as areas of accelerated fall through. The area highlighted by the box in the top indicates the thrashing of a large sequence. The area highlighted by the box in the bottom indicates that sequence still in the cache. It is noted that while there are multiple periods with accelerated fall through, some periods are more critical than others. In FIG. 10, the second period of accelerated fall through would not characterize a fall through greater than the threshold in the disclosed approach.

Figure 11:
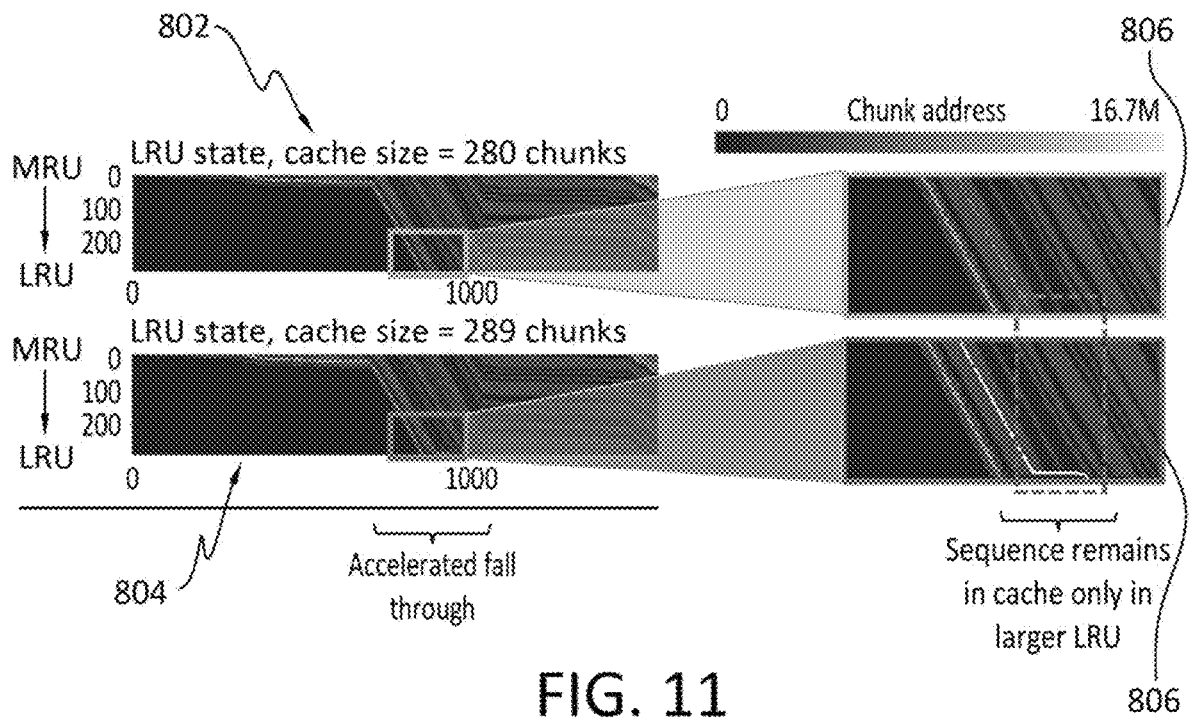
FIG. 11 discloses a detailed view of the highlighted (in FIG. 10) accelerated fall through periods for the smaller and slightly larger cache, showing a sequence remaining only in the larger cache.

With attention now to FIG. 11, the highlighted areas of FIG. 10 are addressed in further detail. In particular, FIG. 11 provides a detailed view of the highlighted accelerated fall through periods for the smaller cache 802 (280 chunks) and slightly larger cache 804 (289 chunks), showing a sequence 806 remaining only in the larger cache. Particularly, in the smaller cache 802, it can be seen that a group of chunks moves continuously from MRU to LRU. On the other hand, in the larger cache 804, the same group of chunks initially moves steadily from the MRU to LRU, but before reaching the LRU, that group of chunks is retained in the cache for a time, as shown by the horizontal portion of the line, and only later evicted.

Figure 12:
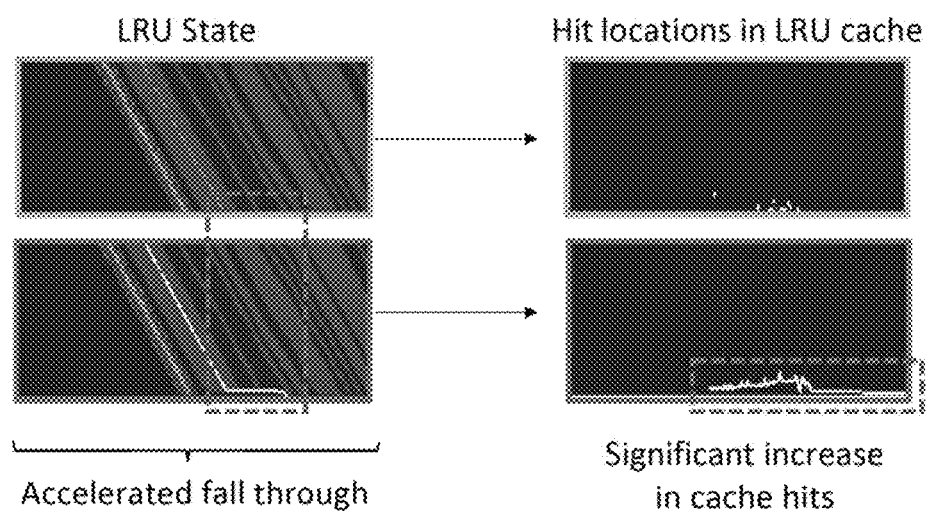
FIG. 12 discloses how a significant increase in cache hits impacts the efficiency of the system as a whole, even with a very small adjustment to the LRU cache queue.

Thus, the example of FIG. 11 demonstrates the issue described earlier herein, and how an adaptation of even a very small portion of the cache may result in avoiding, or at least reducing, the sequential thrashing issue. Nevertheless, increasing the cache size is not typically possible, and may just postpone the thrashing problem. Further, the ideal cache size may not be known in advance. Thus, the disclosed methods for dynamically determining the size of the protected queue upon the detection of accelerated fall through may detect, and protect, the highlighted sequence in FIGS. 10 and 11. An example of the gain that may be realized by sequence protection in this example is disclosed in FIG. 12, which illustrates that even with a very small adjustment to the LRU cache queue, such as from 280 chunks to 289 chunks for example, a significant increase in cache hits may be realized which may improve the efficiency of the system as a whole since it reduces the number of times that a chunk must be retrieved from the relatively slower backend storage.

E. Further Example Embodiments

Following are some further example embodiments of the invention. These are presented only by way of example and are not intended to limit the scope of the invention in any way.

Embodiment 1

A method, comprising: determining a fall through threshold value for a cache; computing a length 's' of a sequence that is close to LRU eviction, and the length 's' is computed when a current fall through metric value is greater than the fall through threshold value; when the sequence length 's' is greater than a predetermined threshold length 'k,' performing a first shift of an LRU position to define a protected queue of the cache; initializing a counter with a value of 'r'; decrementing the counter each time a requested page is determined to be included in the protected queue, until 'r'=0; and performing a second shift of the LRU position.

Embodiment 2

The method as recited in embodiment 1, wherein performing a first shift of the LRU position to define a protected queue of the cache comprises moving the LRU position to a point that is closer to a front of the cache than the start of the protected queue.

Embodiment 3

The method as recited in any of embodiments 1-2, wherein performing a second shift of the LRU position comprises moving the LRU position to an end of the cache.

Embodiment 4

The method as recited in any of embodiments 1-3, wherein performing a first shift of the LRU position to define a protected queue of the cache comprises moving the LRU position forward in the cache a number of slots s', and the number of cache slots by which the LRU is shifted is determined by the length of the sequence 's' and by the number of any skips in the cache.

Embodiment 5

The method as recited in any of embodiments 1-4, wherein the LRU position is the point of eviction from the cache.

Embodiment 6

The method as recited in any of embodiments 1-5, wherein the length of the sequence is determined with respect to one or more skips and/or gaps in the cache.

Embodiment 7

The method as recited in any of embodiments 1-6, wherein the sequence length 's' is determined based in part on a skip in the cache.

Embodiment 8

The method as recited in any of embodiments 1-7, wherein after the second LRU shift, pages in the protected queue are no longer protected.

Embodiment 9

The method as recited in any of embodiments 1-8, wherein when 'r'=0 and a request is received for an unevicted page that was in the protected cache when 'r'>0, the requested page is promoted to a position closer to the front of the cache than the position of that page just prior to the request.

Embodiment 10

The method as recited in any of embodiments 1-9, further comprising setting a permissible gap length and/or skip length for use in computing the length 's.'

Embodiment 11

A method for performing any of the operations, methods, or processes, or any portion of any of these, disclosed herein.

Embodiment 12

A non-transitory storage medium having stored therein instructions that are executable by one or more hardware processors to perform the operations of any one or more of embodiments 1-11.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 13:
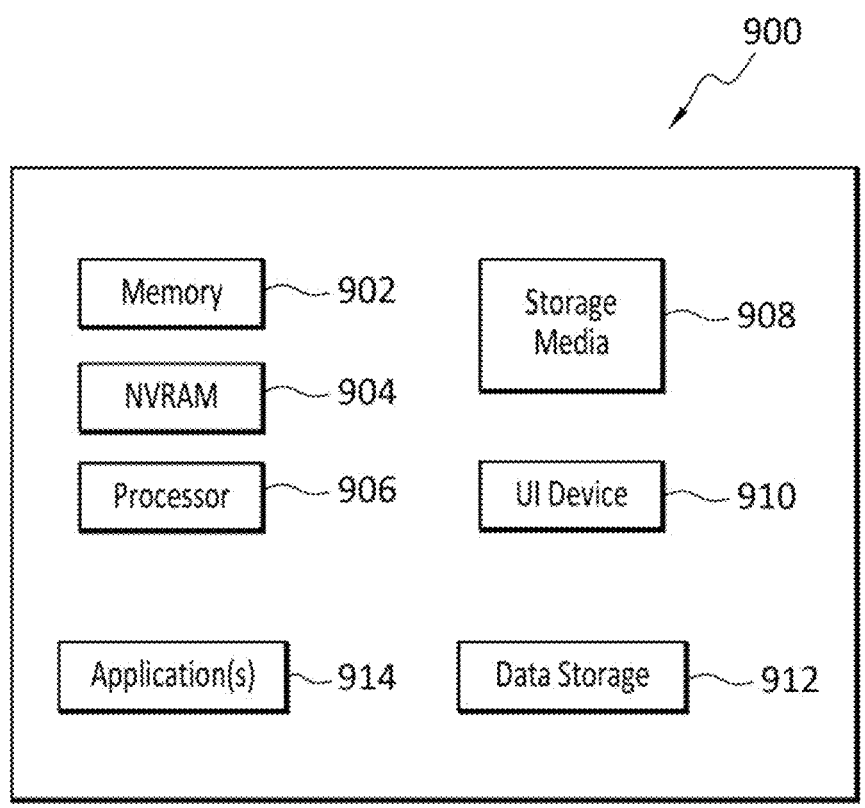
FIG. 13 discloses aspects of an example computing entity.

With reference briefly now to FIG. 13, any one or more of the entities disclosed, or implied, by FIGS. 1-12 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 13.

In the example of FIG. 13, the physical computing device 900 includes a memory 902 which may include one, some, or all, of random access memory (RAM), non-volatile random access memory (NVRAM) 904, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    determining a fall through threshold value for a cache;
    computing a length 's' of a sequence that is close to LRU eviction, and the length 's' is computed when a current fall through metric value is greater than the fall through threshold value;
    when the sequence length 's' is greater than a predetermined threshold length 'k,' performing a first shift of an LRU position to define a protected queue of the cache;
    initializing a counter with a value of 'r';
    decrementing the counter each time a requested page is determined to be included in the protected queue, until 'r'=0; and
    performing a second shift of the LRU position.

2. The method as recited in claim 1, wherein performing the first shift of the LRU position to define the protected queue of the cache comprises moving the LRU position to a point that is closer to a front of the cache than a start of the protected queue.

3. The method as recited in claim 1, wherein performing the second shift of the LRU position comprises moving the LRU position to an end of the cache.

4. The method as recited in claim 1, wherein performing the first shift of the LRU position to define the protected queue of the cache comprises moving the LRU position forward in the cache a number of cache slots, and the number of cache slots by which the LRU is shifted is determined by the length of the sequence 's' and by a number of any skips in the cache.

5. The method as recited in claim 1, wherein the LRU position is a point of eviction from the cache.

6. The method as recited in claim 1, wherein the length 's' of the sequence is determined with respect to one or more skips and/or gaps in the cache.

7. The method as recited in claim 1, wherein the sequence length 's' is determined based in part on a skip in the cache.

8. The method as recited in claim 1, wherein after the second LRU shift, pages in the protected queue are no longer protected.

9. The method as recited in claim 1, wherein when 'r'=0 and a request is received for an unevicted page that was in the protected cache when 'r'>0, the requested page is promoted to a position closer to a front of the cache than a position of that page just prior to the request.

10. The method as recited in claim 1, further comprising setting a permissible gap length and/or skip length for use in computing the length 's'.

11. A non-transitory storage medium having stored therein instructions that are executable by one or more hardware processors to perform operations comprising:
    determining a fall through threshold value for a cache;
    computing a length 's' of a sequence that is close to LRU eviction, and the length 's' is computed when a current fall through metric value is greater than the fall through threshold value;
    when the sequence length 's' is greater than a predetermined threshold length 'k,' performing a first shift of an LRU position to define a protected queue of the cache;
    initializing a counter with a value of 'r';
    decrementing the counter each time a requested page is determined to be included in the protected queue, until 'r'=0; and
    performing a second shift of the LRU position.

12. The non-transitory storage medium as recited in claim 11, wherein performing the first shift of the LRU position to define the protected queue of the cache comprises moving the LRU position to a point that is closer to a front of the cache than a start of the protected queue.

13. The non-transitory storage medium as recited in claim 11, wherein performing the second shift of the LRU position comprises moving the LRU position to an end of the cache.

14. The non-transitory storage medium as recited in claim 11, wherein performing the first shift of the LRU position to define the protected queue of the cache comprises moving the LRU position forward in the cache a number of cache slots, and the number of cache slots by which the LRU is shifted is determined by the length of the sequence 's' and by a number of any skips in the cache.

15. The non-transitory storage medium as recited in claim 11, wherein the LRU position is a point of eviction from the cache.

16. The non-transitory storage medium as recited in claim 11, wherein the length 's' of the sequence is determined with respect to one or more skips and/or gaps in the cache.

17. The non-transitory storage medium as recited in claim 11, wherein the sequence length 's' is determined based in part on a skip in the cache.

18. The non-transitory storage medium as recited in claim 11, wherein after the second LRU shift, pages in the protected queue are no longer protected.

19. The non-transitory storage medium as recited in claim 11, wherein when 'r'=0 and a request is received for an unevicted page that was in the protected cache when 'r'>0, the requested page is promoted to a position closer to a front of the cache than a position of that page just prior to the request.

20. The non-transitory storage medium as recited in claim 11, wherein the operations further comprise setting a permissible gap length and/or skip length for use in computing the length 's'.

* * * * *